Patented May 23, 1933

1,911,085

UNITED STATES PATENT OFFICE

HERBERT AUGUST LUBS, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF MANUFACTURING THIAZOLES

No Drawing. Original application filed May 15, 1929, Serial No. 363,402. Divided and this application filed March 24, 1933. Serial No. 662,575.

This invention relates to the production of intermediates which are useful in the manufacture of thioindigoid dyestuffs, and specifically the type of intermediates such as aryl-amino-thiazoles acids.

This application is a division of application Ser. No. 363,402 filed May 15, 1929.

The methods heretofore practiced for the manufacture of amino-aryl-thioglycollic acids are relatively complicated and expensive. In many cases the products obtained by said methods are very low in purity and the yields very poor.

Another object is the production of amino-aryl-thioglycollic acids by a simple, easily controlled series of reactions, the various steps of which proceed with great smoothness and in many cases with almost theoretical yields. A further object of my invention is the production of thioglycollic acids of hitherto unattainable purity without tedious and expensive purifications. Further objects will appear hereinafter.

My invention in its broad aspect consists in (1) the transformation of an aryl or diaryl thiourea by means of a halogen, such as chlorine or bromine, to an amino or arylamino thiazole with (2) a subsequent ring splitting of the thiazole nucleus whereby an arylamino mercaptan is produced. (3) The mercaptan thus formed is then condensed with cloracetic acid or a suitable metallic salt thereof to form the desired thioglycollic acid. The reactions occurring may be graphically described as follows:

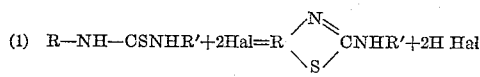

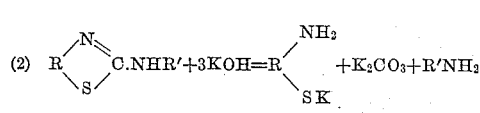

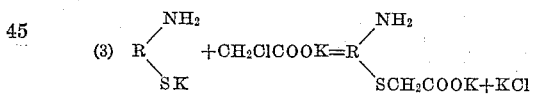

wherein R is an aryl nucleus and R' is either an aryl or alkyl nucleus or hydrogen. By way of definition I wish it to be understood that by aryl I mean either the substituted or unsubstituted nucleus, and by alkyl I mean either the substituted or unsubstituted group. By my method a wide variety of amino-aryl-thioglycollic acids can be produced, depending upon what thiourea is employed at the outset.

To exemplify my invention I am setting forth hereinafter certain adaptations of my process.

Example I 17.8 g. of p-ethoxy phenyl thiourea,

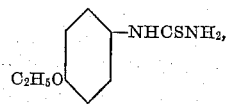

is suspended in about ten parts by weight of carbon tetrachloride. 7.1 g. chlorine are then passed into this suspension or the addition can be continued until there is no further absorption of chlorine. The suspension is then refluxed for a short while, cooled and filtered. After removal of the adhering solvent the filter cake is warmed with water containing sodium bisulfite. After heating for a short while the solution is made alkaline, cooled and filtered. The press cake is then refluxed with about 4 parts of potassium hydroxide and 4 parts of water based on the dry material in the press cake. The heating is continued until ammonia is no longer evolved, the solution further diluted with water, cooled and an aqueous solution containing a molecular equivalent of chloracetic acid added.

The reaction mass is then warmed to 75° C. and held there for about ½ hour. If necessary the solution is then filtered and can be used as such for further transformation into a thioindigoid dye or the anhydride of o-amino ethoxy phenyl thioglycollic can be precipitated by the addition of acid.

Example II

Suspend 196 g. of p-ethoxy-phenyl thiourea in 1000 cc. of chlorobenzene and heat the suspension to about 60–65° C. Then add 175 g. of bromine with vigorous agitation. Stir until the active evolution of hydrobromic acid has ceased. Filter off the granular precipitate and wash with a small amount of chlorobenzol or other suitable organic solvent. The product so obtained can then be dried and transformed to o-aminoethoxy phenyl thioglycollic acid as described in Example I.

*Example III*

Suspend 1 part of p-tolyl thiourea

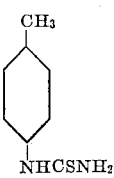

in 2 parts of glacial acetic acid and add 1 part of bromine dissolved in 1 part of glacial acetic acid. The reaction mass is then poured into 10 parts of water containing 1 part of sodium bisulfite. After neutralizing the suspension with alkali the white precipitate is filtered off and fused under reflux with 4 parts of caustic potash and 4 parts of water. When the evolution of ammonia has ceased the mass is diluted with water and one part of chloracetic acid added. The solution is then warmed at 60–70° C. for about ½ hour, cooled and filtered. The alkaline solution of 2-amino-5-methyl-1-phenyl-thioglycollic acid can be used as such for further transformation or isolated as the anhydride of 2-amino-5-methyl-1-phenyl-thioglycollic by precipitation with acid.

*Example IV*

1 part of o-tolyl thiourea,

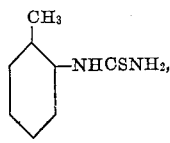

in 10 parts of carbon tetrachloride and add slowly 4.5 parts of bromine in 1 part of carbon tetrachloride. Reflux the mixture for about ½ hour, cool, filter and wash with carbon tetrachloride. The press cake is then boiled with about 2 parts of alcohol until a practically colorless solution is obtained, diluted with an equal weight of water and neutralized with an excess of ammonium hydroxide. After cooling the white crystalline product is filtered off and refluxed with 4 parts of caustic potash and 2 parts of water based on the solid content of the press cake. The heating is continued for about 2 hours or until no more ammonia is evolved. The reaction mass is then diluted with water and 1 part of chloracetic acid added. After warming for several hours at about 70° C. the solution is filtered. Upon acidification the anhydride of 2-amino-3-methyl-5-bromo-1-phenyl thioglycollic is obtained. If the reaction products formed by the action of bromine on the tolylthiourea had been treated with water and bisulfite instead of alcohol, the final product obtained would have been 2-amino-3-methyl-1-phenyl-thioglycollic acid anhydride instead of the corresponding compound containing bromine substituted in the benzene nucleus.

It is to be understood that the specific compounds recited in the examples given hereabove are recited only for the purposes of illustrating my invention. I do not, therefore, wish to be limited to the precise compounds and precise modes of procedure described. Other and different thioureas may be employed as starting materials, it being only necessary that the thiourea contain an aryl or substituted aryl nucleus corresponding to the general formula R—NHCSNHR', wherein R is a substituted or unsubstituted aryl nucleus and R' is either an alkyl or aryl nucleus or hydrogen.

The oxidizing step may be accomplished by various halogens, bromine and chlorine being listed merely for the purposes of illustration. Although potassium hydroxide is a convenient caustic to employ in the second stage of my process, other alkaline hydroxides and, in certain cases, other alkaline materials, such as, for example, alkaline carbonates and bicarbonates may be employed. The same holds true of the chloracetic acid used in the third stage of my process. The acid itself may be employed, but metallic salts of chloracetic acid are equally useful.

As many apparently widely different embodiments of this invention may be made without departing from the spirit thereof, it is to be understood that I do not limit myself to the foregoing examples or descriptions except as indicated in the following patent claims.

I claim:

1. The process of preparing amino-aryl thiazoles, which comprises treating an aryl thiourea with a chlorinating agent.

2. A process for producing amino-thiazole-compounds of the general formula:

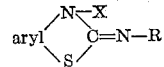

wherein aryl means an aromatic residue which may contain further substituents, X means hydrogen or an alkyl or aryl- group, and R hydrogen or an aryl residue, which process comprises acting with chlorine on thiourea-derivatives of the general formula:

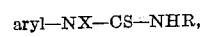

wherein aryl, X and R have the aforesaid signification.

3. A process for producing amino-thiazole-compounds of the general formula:

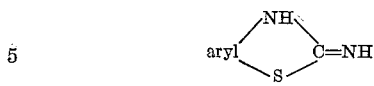

wherein aryl means an aromatic residue which may contain further substituents, which process comprises acting with chlorine on thiourea-derivatives of the general formula:

aryl—NH—CS—NH$_2$ wherein aryl has the aforesaid signification.

4. A process for producing amino-thiazole-compounds of the general formula:

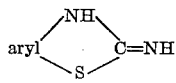

wherein aryl means an aromatic residue which may contain further substituents, which process comprises acting with chlorine in presence of an organic diluent on thiourea derivatives of the general formula:

aryl—NH—CS—NH$_2$ wherein aryl has the aforesaid signification.

5. A process for producing amino-thiazole-compounds of the general formula:

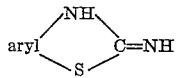

wherein aryl means an aromatic residue which may contain further substituents, which process comprises acting with chlorine in a quantity not exceeding considerably the theoretical amount on thiourea-derivatives of the general formula:

aryl—NH—CS—NH$_2$ wherein aryl has the aforesaid signification.

6. A process for producing amino-thiazole-compounds of the general formula:

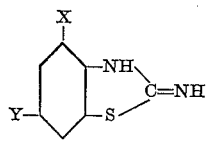

wherein X means hydrogen or alkyl or oxalkyl, Y means hydrogen, halogen, alkyl or oxalkyl, which process comprises acting with chlorine on thiourea-derivatives of the general formula:

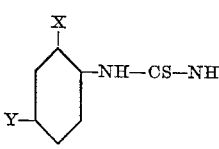

wherein X and Y have the aforesaid signification.

7. A process for producing 6-alkoxy-2-aminobenzothiazole-compounds of the formula:

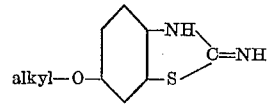

which process comprises acting with chlorine on 4-alkoxy-phenyl-thiourea-derivatives of the formula:

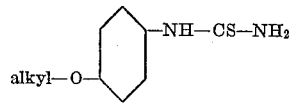

8. A process for producing amino-thiazole compounds of the general formula:

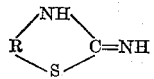

wherein R is a residue of the benzene series, which comprises treating with chlorine a thiourea derivative of the general formula:

R—NH—CS—NH$_2$ wherein R has the aforesaid signification, under such conditions that R of the thiourea is not substituted by chlorine atoms.

In testimony whereof I affix my signature.

HERBERT AUGUST LUBS.

CERTIFICATE OF CORRECTION.

Patent No. 1,911,085.  May 23, 1933.

HERBERT AUGUST LUBS.

It is hereby certified that error appears in the printed specification of the above numbered patent requiring correction as follows: Page 1, line 5, strike out the word "acids"; and that the said Letters Patent should be read with this correction therein that the same may conform to the record of the case in the Patent Office.

Signed and sealed this 15th day of August, A. D. 1933.

(Seal)

M. J. Moore.
Acting Commissioner of Patents.